(12) United States Patent
Zeng et al.

(10) Patent No.: US 7,644,075 B2
(45) Date of Patent: Jan. 5, 2010

(54) KEYWORD USAGE SCORE BASED ON FREQUENCY IMPULSE AND FREQUENCY WEIGHT

(75) Inventors: Hua-Jun Zeng, Beijing (CN); Hua Li, Beijing (CN); Jian Hu, Beijing (CN); Han Peng, Beijing (CN); Zheng Chen, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 284 days.

(21) Appl. No.: 11/756,740

(22) Filed: Jun. 1, 2007

(65) Prior Publication Data

US 2008/0301117 A1    Dec. 4, 2008

(51) Int. Cl.
 G06F 17/30 (2006.01)
(52) U.S. Cl. .................................. 707/5; 707/3; 707/4
(58) Field of Classification Search .................. 707/3–5, 707/6–7
 See application file for complete search history.

(56) References Cited

U.S. PATENT DOCUMENTS

| | | | | |
|---|---|---|---|---|
| 5,987,457 | A * | 11/1999 | Ballard | 707/5 |
| 6,473,753 | B1 * | 10/2002 | Katariya et al. | 707/4 |
| 6,502,091 | B1 | 12/2002 | Chundi et al. | |
| 7,146,359 | B2 | 12/2006 | Castellanos | |
| 7,346,839 | B2 * | 3/2008 | Acharya et al. | 707/3 |
| 7,562,076 | B2 * | 7/2009 | Kapur | 707/3 |
| 2001/0047355 | A1 | 11/2001 | Anwar | |
| 2002/0184212 | A1 * | 12/2002 | Ugai et al. | 707/6 |
| 2003/0033333 | A1 * | 2/2003 | Nishino et al. | 707/531 |
| 2003/0088554 | A1 * | 5/2003 | Ryan et al. | 707/3 |
| 2005/0198068 | A1 * | 9/2005 | Mukherjee et al. | 707/104.1 |
| 2006/0224579 | A1 | 10/2006 | Zheng | |
| 2006/0230015 | A1 | 10/2006 | Gupta | |
| 2006/0288000 | A1 | 12/2006 | Gupta | |
| 2007/0016579 | A1 | 1/2007 | Kaul et al. | |
| 2007/0033275 | A1 * | 2/2007 | Toivonen et al. | 709/224 |
| 2007/0038624 | A1 * | 2/2007 | Choi et al. | 707/5 |
| 2007/0150470 | A1 * | 6/2007 | Brave et al. | 707/6 |
| 2008/0133503 | A1 * | 6/2008 | Popescul et al. | 707/5 |

OTHER PUBLICATIONS

"Identifying Similarities, Periodicities and Bursts for Online Search Queries," Vlachos et al. SIGMOD 2004 (Jun. 2004)(11 pages). Recovered from ACM on May 4, 2009.*
Srivastava, Jaideep, et al., "Web Usage Mining: Discovery and Applications of Usage Patterns from Web Data," SIGKDD Explorations, vol. 1, Issue 2, Jan. 2000 (12 pages).
Arimura, Hiroki, "Text Data Mining with Optimized Pattern Discovery," 2000 (4 pages).
Tan, Bin et al., "Mining Long-Term Search History to Improve Search Accuracy," KDD '06, Aug. 20-23, 2006 (6 pages).

* cited by examiner

*Primary Examiner*—Neveen Abel Jalil
*Assistant Examiner*—Daniel Kinsaul
(74) *Attorney, Agent, or Firm*—Perkins Coie LLP

(57) ABSTRACT

A method and system for assessing keyword usage based on frequency of usage of the keywords during various periods is provided. A keyword usage measurement system is provided with the frequency of keywords during various periods. The measurement system then calculates a recent usage score for a keyword by combining a frequency impulse score for the keyword with a frequency weight for the keyword. The frequency impulse score for a keyword indicates whether a recent change in the frequency of the keyword has occurred. The frequency weight for a keyword indicates a recent measure of the frequency of the keyword.

14 Claims, 5 Drawing Sheets

KEYWORD USAGE SCORE BASED ON FREQUENCY IMPULSE AND FREQUENCY WEIGHT

BACKGROUND

Many search engine services, such as Google and Yahoo!, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service identifies web pages that may be related to the search request based on how well the keywords of a web page match the words of the query. The search engine service then displays to the user links to the identified web pages in an order that is based on a ranking that may be determined by their relevance to the query, popularity, importance, and/or some other measure.

Search engine services typically track all search requests submitted by users by storing the search requests and their corresponding search results in a search log. A search log also includes an indication of a date and time associated with the search request (e.g., the time the search request was submitted). For example, when a user submits the search request "earthquake tsunami," the search engine service identifies matching documents (e.g., web pages), ranks those documents, and displays to the user links to the documents ordered based on the rank of the documents. The search engine service may also add an entry to the search log that contains the search request "earthquake tsunami" and the links of the search result.

Search logs may also be generated by search systems that are unrelated to web page searching. For example, a web site of a company that sells the company's products may allow users to search for products of interest using search requests. When a user submits a search request, a search system of the web site may search an electronic catalog of the products to identify products that best match the search request. The web site then generates a web page that identifies the matching products and provides that web page to the user. The web site may maintain a search log of the product search requests. As another example, a web site of a provider of a database of patents may provide a search system to search the content of the patents. When a user submits a search request, the search system of the web site searches the database of patents to identify the patents that best match the search request. The web site then presents those patents to the user. The web site may also maintain a search log of the patent search requests.

Because the search logs contain the search requests of users, they may contain valuable information on what is currently of interest to users. For example, when a current event occurs, users of a search engine may submit search requests relating to that event in hopes of locating information about the event. If the event is an earthquake, then the users may enter search requests such as "seismograph," "Richter scale," "tsunami," and so on. Although techniques have been developed to identify keywords whose popularity is increasing rapidly, these techniques may not provide an effective and easy-to-calculate measure of this increase.

SUMMARY

A method and system for assessing keyword usage based on frequency of usage of the keywords during various periods is provided. A keyword usage measurement system is provided with the frequency of keywords during various periods. The measurement system may calculate the total frequency or number of occurrences of multiple keywords for each period. The measurement system then calculates a recent usage score for a keyword by combining a frequency impulse score for the keyword with a frequency weight for the keyword. The frequency impulse score for a keyword indicates whether a recent change in the frequency of the keyword has occurred. The frequency weight for a keyword indicates a recent measure of the frequency of the keyword. The combination of the frequency impulse score and the frequency weight into a recent usage score provides a measurement of the change in usage of a keyword adjusted based on the magnitude of the frequency of the keyword.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
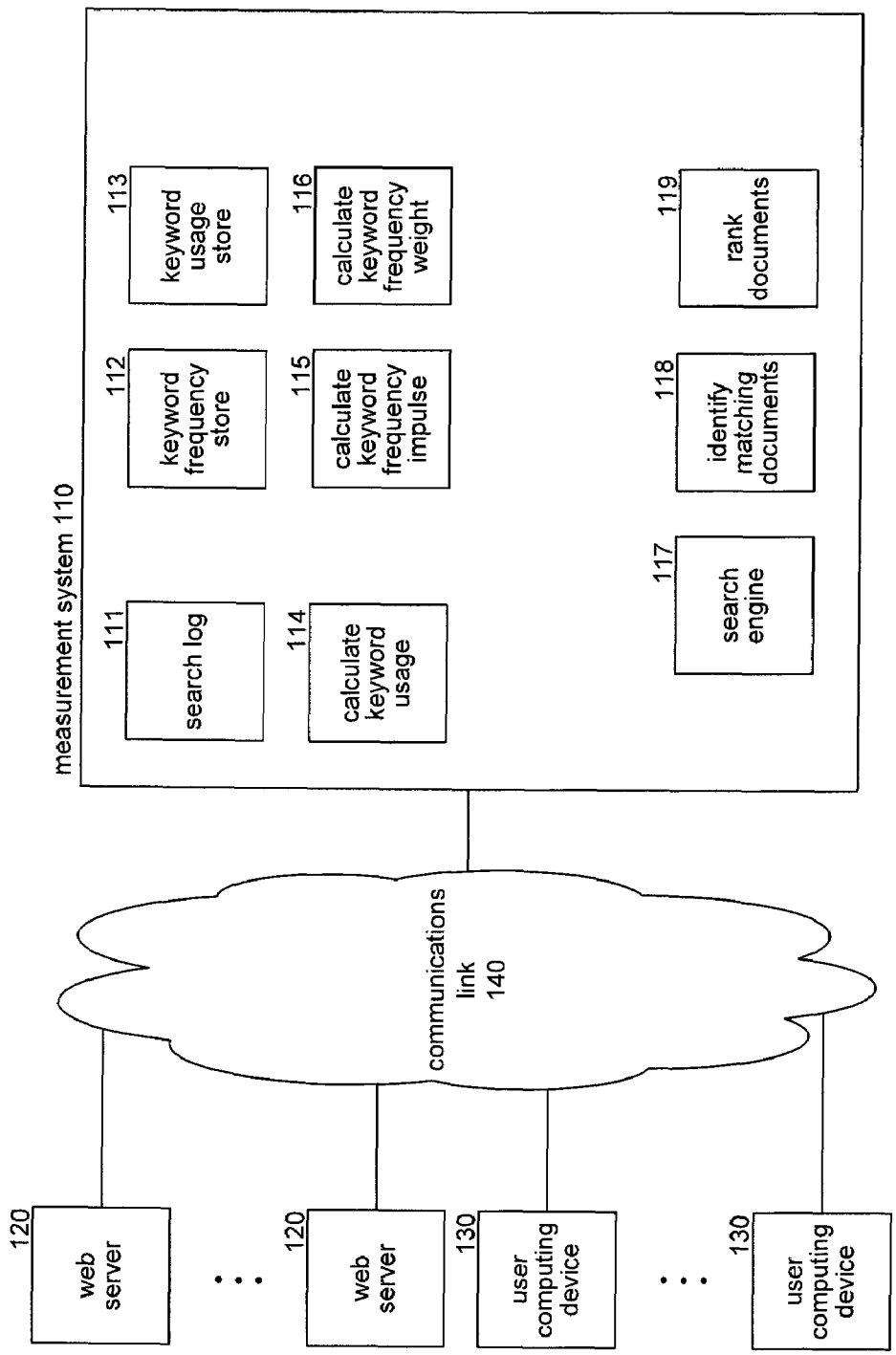
FIG. 1 is a block diagram that illustrates components of the measurement system in one embodiment.

A method and system for assessing keyword usage based on frequency of usage of the keywords during various periods is provided. In one embodiment, a keyword usage measurement system is provided with the frequency of keywords during various periods. The measurement system may analyze search logs to calculate the number of occurrences of each keyword in the search requests of the search logs. For example, the measurement system may calculate that the keyword "tsunami" occurred 100 times on January 1, 125 times on January 2, and 1000 times on January 3. The measurement system may also calculate the total frequency or number of occurrences of all the keywords for each period. For example, the measurement system may calculate the total frequency to be 2000 on Jan. 1, 2500 on January 2, and 3000 on January 3. The measurement system then calculates a recent usage score for a target keyword by combining a frequency impulse score for the target keyword with a frequency weight for the target keyword. The frequency impulse score for a target keyword indicates whether a recent change in the frequency of the target keyword has occurred. For example, the frequency impulse score for the keyword of "tsunami" for January 3 will indicate that there was a spike in the number of search requests that included that keyword. The frequency weight for a target keyword indicates a recent measure of the frequency of the target keyword. For example, a keyword with a frequency of 1000 on a certain day will have a higher frequency weight than a keyword with a frequency of 10. The combination of the frequency impulse score and the frequency weight into a recent usage score provides a measurement of the change in usage of a target keyword adjusted based on the magnitude of the frequency of the keyword. As a result, a keyword with a frequency impulse score of 1 and with a frequency of only 10 may have a lower recent usage score than a keyword with a frequency impulse score of 0.5 but with a frequency of 1000.

In one embodiment, the measurement system calculates the recent usage score for a keyword that is based on the following:

$$U_n = I_n * W_n \quad (1)$$

where $U_n$ represents the recent usage score for period n, $I_n$ represents the frequency impulse score for period n, and $W_n$ represents the frequency weight for period n. The frequency impulse score may represent a difference between a ratio of a recent frequency of the keyword to a recent total frequency for multiple keywords and a ratio of a combination of less recent frequencies of the keyword to less recent total frequencies for multiple keywords. The frequency impulse score may be represented by the following:

$$I_n = \left(f_n - \sum_{i=1}^{n-1} f_i * \alpha_i\right) / f_n \quad (2)$$

where $fp_n$ represents the frequency ($freq_n$) of the keyword during the period n divided by the total frequency of all keywords during the period n and $\alpha_i$ represents a decay factor for period i. The decay factor reduces the effect of frequencies of less recent periods. The decay factor may be represented by the following:

$$\alpha_i = 2^{i-n} \quad (3)$$

A few examples will help illustrate a frequency impulse function that generates a frequency impulse score. The following table illustrates the frequency impulse score for day 5 in four different scenarios. Each scenario includes a recent day (i.e., day 5) and four days of history (i.e., days 1-4). The first row of each scenario indicates the frequency for the keyword for that day, and the second row indicates the total frequency for all keywords for that day. For example, the first scenario has a keyword frequency of 64 and a total frequency of 1000 for day 5. The frequency impulse score for the first scenario is 1.00, which indicates a frequency spiked up from a zero frequency to a non-zero frequency on the most recent day. The frequency impulse score for the second scenario is 0.0625, which indicates that there is very little change in the frequency for the most recent day compared to previous days. If the history had included more days with the same keyword frequency and total frequency, then the frequency impulse score would approach 0.00. The frequency impulse score for the third scenario is −0.9375, which indicates that the frequency spiked down from a non-zero frequency to a zero frequency. If the history had included more days with the same keyword frequency and total frequency, then the frequency impulse score would approach −1.00. The frequency impulse score for the fourth scenario is 0.53125, which indicates a frequency spike to about double the previous frequency. Although the keyword frequencies are the same (i.e., 64) for all the days, the total frequencies are different. The ratio of keyword frequency to total frequency ($f_n$) in Equation 2 accounts for the difference in total frequencies. If the history had included more days with the same keyword frequency and total frequency, then the frequency impulse score would approach 0.5.

| Frequency Impulse Function Scenarios | | | | | | |
|---|---|---|---|---|---|---|
| Scenario | $I_5$ | Day 5 | Day 4 | Day 3 | Day 2 | Day 1 |
| 1. | 1.00 | 64 | 0 | 0 | 0 | 0 |
| | | 1000 | 1000 | 1000 | 1000 | 1000 |
| 2. | .0625 | 64 | 64 | 64 | 64 | 64 |
| | | 1000 | 1000 | 1000 | 1000 | 1000 |
| 3. | −.9375 | 0 | 64 | 64 | 64 | 64 |
| | | 1000 | 1000 | 1000 | 1000 | 1000 |
| 4. | .53125 | 64 | 64 | 64 | 64 | 64 |
| | | 1000 | 2000 | 2000 | 2000 | 2000 |

The frequency weight of a keyword may be based on a logarithm of the recent frequency of the keyword and a decay factor applied to less recent frequencies of the keyword. The frequency weight may be represented as follows:

$$W_n = \log\left(\sum_{i=1}^{n} freq_i * \alpha_i\right) \quad (4)$$

A few examples will help illustrate a frequency weight function that generates the frequency weights. The following table illustrates frequency weights for day 5 in the four scenarios described above. The frequency weight for the first scenario is 6.00, which is the logarithm of the frequency of day 5. Since the frequency for the other days is 0, the frequency weight is only based on day 5. The frequency weight for the second and fourth scenarios is 6.95. The contribution of the frequencies of the history days decays logarithmically. If the history had included more days with the same keyword frequency, then the frequency weight would approach 7.00. The frequency weight for the third scenario is 5.9. Since the frequency of day 5 is zero, it contributes nothing to the frequency weight. If the history had included more days with the same keyword frequency, then the frequency weight would approach 6.00. According to this frequency weight function, the frequency weight will increase logarithmically with frequency. As a result a frequency of 1,000,000 will have a frequency weight of about 20 and a frequency of 1,000 will have a frequency weight of about 10.

| Frequency Weight Function Scenarios | | | | | | |
|---|---|---|---|---|---|---|
| Scenario | $W_5$ | Day 5 | Day 4 | Day 3 | Day 2 | Day 1 |
| 1. | 6.00 | 64 | 0 | 0 | 0 | 0 |
| | | 1000 | 1000 | 1000 | 1000 | 1000 |
| 2. | 6.95 | 64 | 64 | 64 | 64 | 64 |
| | | 1000 | 1000 | 1000 | 1000 | 1000 |

-continued

Frequency Weight Function Scenarios

| Scenario | $W_5$ | Day 5 | Day 4 | Day 3 | Day 2 | Day 1 |
|---|---|---|---|---|---|---|
| 3. | 5.90 | 0/1000 | 64/1000 | 64/1000 | 64/1000 | 64/1000 |
| 4. | 6.95 | 64/1000 | 64/2000 | 64/2000 | 64/2000 | 64/2000 |

A few examples will help illustrate a recent usage function that generates the recent usage measurement. The following table illustrates recent usage scores for day 5 in the four scenarios described above. The recent usage score of 6.00 in the first scenario indicates that the keyword has seen a more recent increase in usage than the other scenarios. The recent usage score of −5.53 in the third scenario indicates that the keyword has seen a more recent decrease in usage than the other scenarios.

Recent Usage Function Scenarios

| Scenario | $U_5 = I_5 * W_5$ | Day 5 | Day 4 | Day 3 | Day 2 | Day 1 |
|---|---|---|---|---|---|---|
| 1. | 6.00 | 64/1000 | 0/1000 | 0/1000 | 0/1000 | 0/1000 |
| 2. | 0.4344 | 64/1000 | 64/1000 | 64/1000 | 64/1000 | 64/1000 |
| 3. | −5.53 | 0/1000 | 64/1000 | 64/1000 | 64/1000 | 64/1000 |
| 4. | 3.69 | 64/1000 | 64/2000 | 64/2000 | 64/2000 | 64/2000 |

The recent usage score of a keyword can be used in many applications. For example, a search engine service may use the recent usage score to rank search results. If a document of a search result contains many occurrences of a keyword with a relatively high recent usage score, then the search engine service may rank that document higher in the search results. In contrast, if the recent usage score is relatively low, then the search engine service may rank that document lower in the search results. As another example, the recent usage score may be used to identify keywords for use in placing advertisements such as sponsored links. If the recent usage score of a keyword is relatively high, then an advertiser may want to place an advertisement along with search results generated from a search request that contains that keyword or a word that relates to that keyword or along with the display of any web page, document, or other content that contains that keyword or a word that relates to that keyword. In contrast, if the recent usage score is relatively low, then an advertiser may want to stop placing advertisements with that keyword.

FIG. 1 is a block diagram that illustrates components of the measurement system in one embodiment. The measurement system 110 is connected to web servers 120 and user computing devices 130 via communications link 140. The web servers may include various web sites and search engine services. The measurement system includes a search log store 111, a keyword frequency store 112, and a keyword usage store 113. The search log store may have an entry for each search request submitted to a search engine by a user. Each entry includes the keywords of the search request and a time associated with the search request and optionally an indication of the search results. The keyword frequency store may contain a data structure for each period (e.g., day, week, or month). Each data structure has an entry for each keyword that contains the keyword and the frequency for that keyword during that period. For example, the keyword frequency store may contain a data structure for each of 5 days in the scenarios described above. The keyword usage store has an entry for each keyword that contains the keyword and its recent usage score.

The measurement system also includes a calculate keyword usage component 114, a calculate keyword frequency impulse component 115, and a calculate keyword frequency weight component 116. The calculate keyword usage component invokes the calculate keyword frequency impulse component to calculate the frequency impulse score. The calculate keyword usage component also invokes the calculate keyword frequency weight component to calculate the frequency weight of a keyword. The calculate keyword usage component then combines the frequency impulse score and the frequency weight into a recent usage score.

The measurement system may be part of a search engine system that includes a search engine component 117, an identify matching documents component 118, and a rank documents component 119. The search engine component receives search requests and invokes the identify matching documents component to identify the documents that match the search request. The search engine component then invokes the rank documents component to rank the documents based in part on the recent usage scores of the keyword usage store.

The computing device on which the measurement system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the measurement system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in and used with various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The measurement system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, separate computing systems may collect the keyword frequencies, calculate the recent usage scores from the collected frequencies, and use the recent usage scores (e.g., in ranking documents, placing advertisements, and clustering documents).

Figure 2:
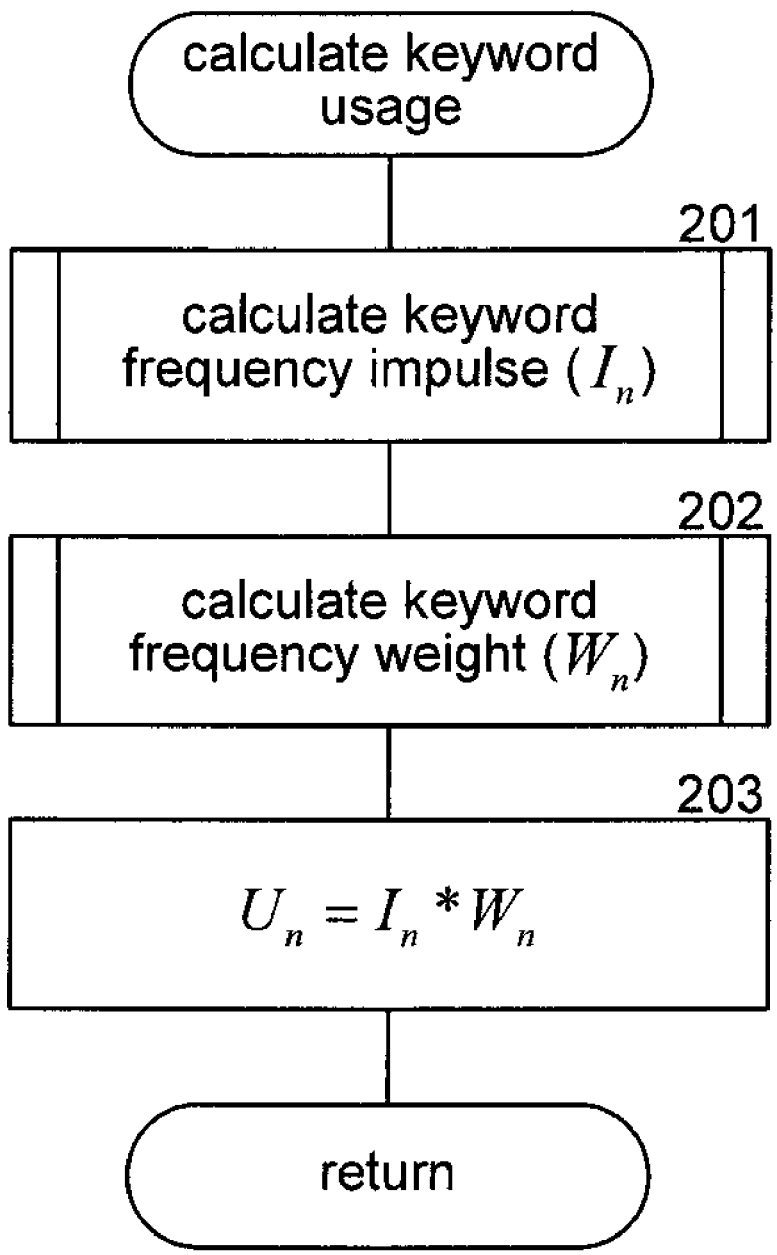
FIG. 2 is a flow diagram that illustrates the processing of the calculate keyword usage component of the measurement system in one embodiment.

FIG. 2 is a flow diagram that illustrates the processing of the calculate keyword usage component of the measurement system in one embodiment. The component is passed a keyword and calculates the recent usage score for that keyword based on the data in the keyword frequency store. In block 201, the component invokes the calculate keyword frequency impulse component to calculate the frequency impulse score for the keyword. In block 202, the component invokes the calculate keyword frequency weight component to calculate the frequency weight for the keyword. In block 203, the component multiplies the frequency impulse score by the frequency weight to generate the recent usage score for the keyword. The component then returns. The component may be invoked for each keyword of the search log and store the recent usage scores in the keyword usage store.

Figure 3:
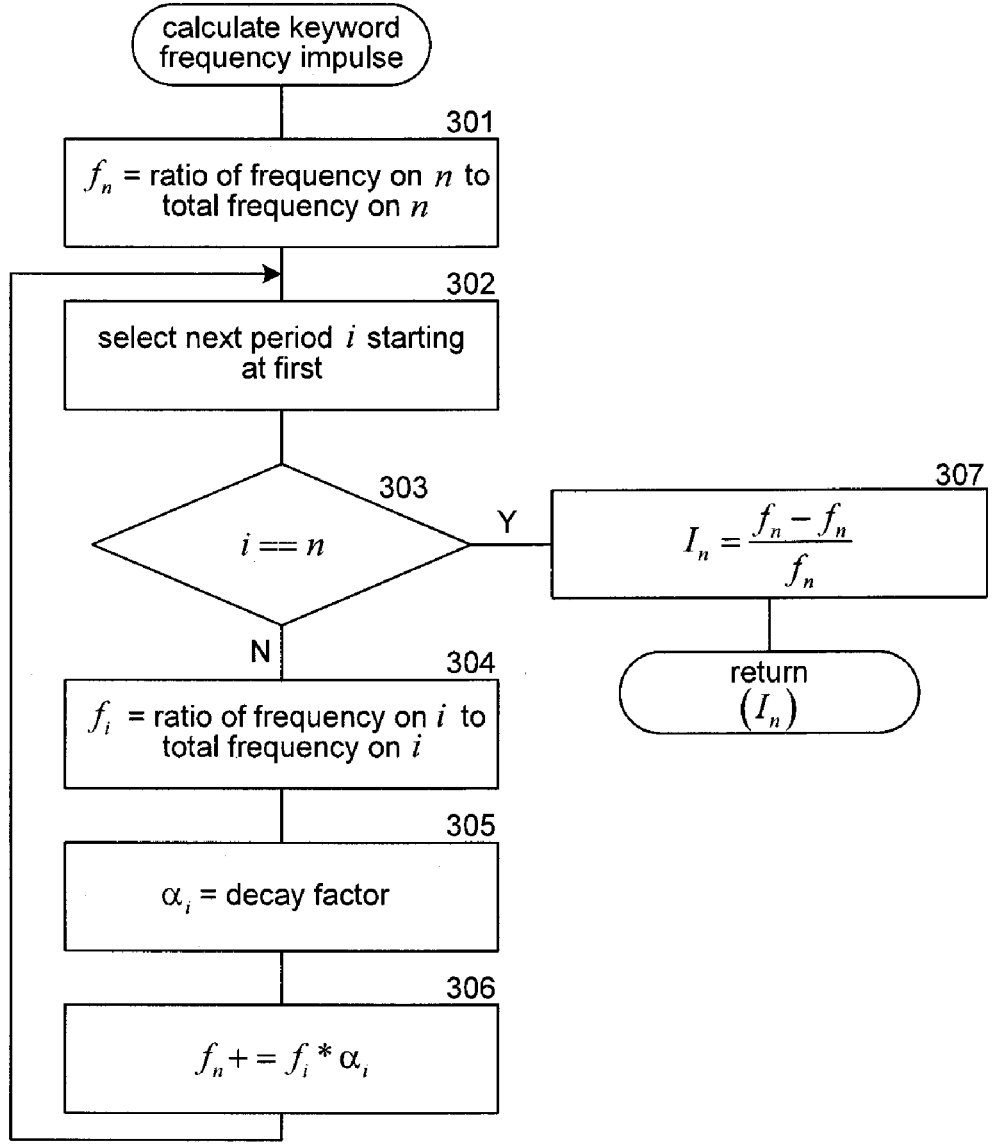
FIG. 3 is a flow diagram that illustrates the processing of the calculate keyword frequency impulse component of the measurement system in one embodiment.

FIG. 3 is a flow diagram that illustrates the processing of the calculate keyword frequency impulse component of the measurement system in one embodiment. The component is passed a keyword and calculates the frequency impulse score for the keyword based on the data of the keyword frequency store. In block 301, the component calculates the ratio of the frequency of the keyword on the most recent day (or more generally period) to the total frequency of the keywords on the most recent day. In blocks 302-306, the component loops accumulating the contribution of the history into the frequency impulse score. In block 302, the component selects the next day starting with the first day. In decision block 303, if all the days have already been selected, then the component continues at block 307, else the component continues at block 304. In block 304, the component calculates the ratio of the frequency of the keyword on the selected day to the total frequency of keywords on the selected day. In block 305, the component calculates a decay factor for the selected day. The decay factor may be calculated according to Equation 3 or may be calculated based on any linear or nonlinear decay factor function. In block 306, the component multiplies the ratio by the decay factor and accumulates it into a ratio contribution for the history. The component then loops to block 302 to select the next day. In block 307, the component combines the ratio of the most recent day with the accumulated ratio of the history and then returns the frequency impulse score.

Figure 4:
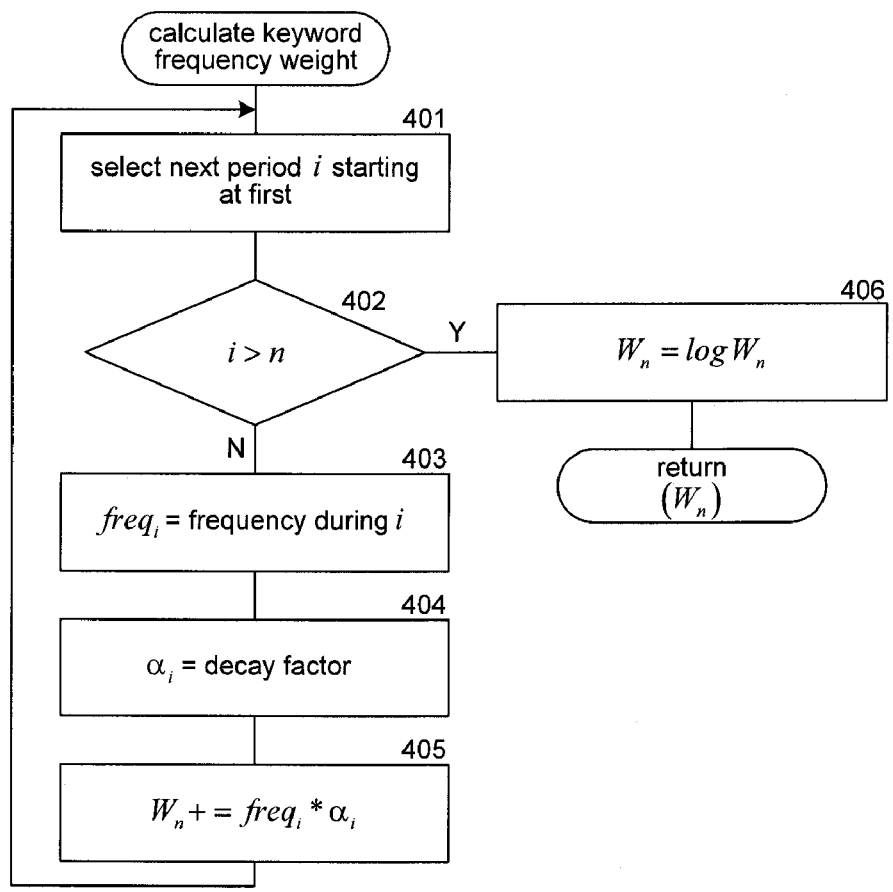
FIG. 4 is a flow diagram that illustrates the processing of the calculate keyword frequency weight component of the measurement system in one embodiment.

FIG. 4 is a flow diagram that illustrates the processing of the calculate keyword frequency weight component of the measurement system in one embodiment. The component is passed a keyword and calculates the frequency weight for the keyword based on the data in the keyword frequency store. In blocks 401-405, the component loops accumulating the frequency weight for the keyword. In block 401, the component selects the next day starting with the first. In decision block 402, if all the days including the most recent day have already been selected, then the component continues at block 406, else the component continues at block 403. In block 403, the component sets the frequency for the selected day. In block 404, the component calculates the decay factor for the selected day. The decay factor may be the same decay factor as used in the frequency impulse score calculation or may be a different decay factor. In block 405, the component accumulates the frequency multiplied by the decay factor into the accumulated frequency weight and then loops to block 401 to select the next day. In block 406, the component sets the frequency weight to the logarithm of the accumulated frequency weight and then returns the frequency weight.

Figure 5:
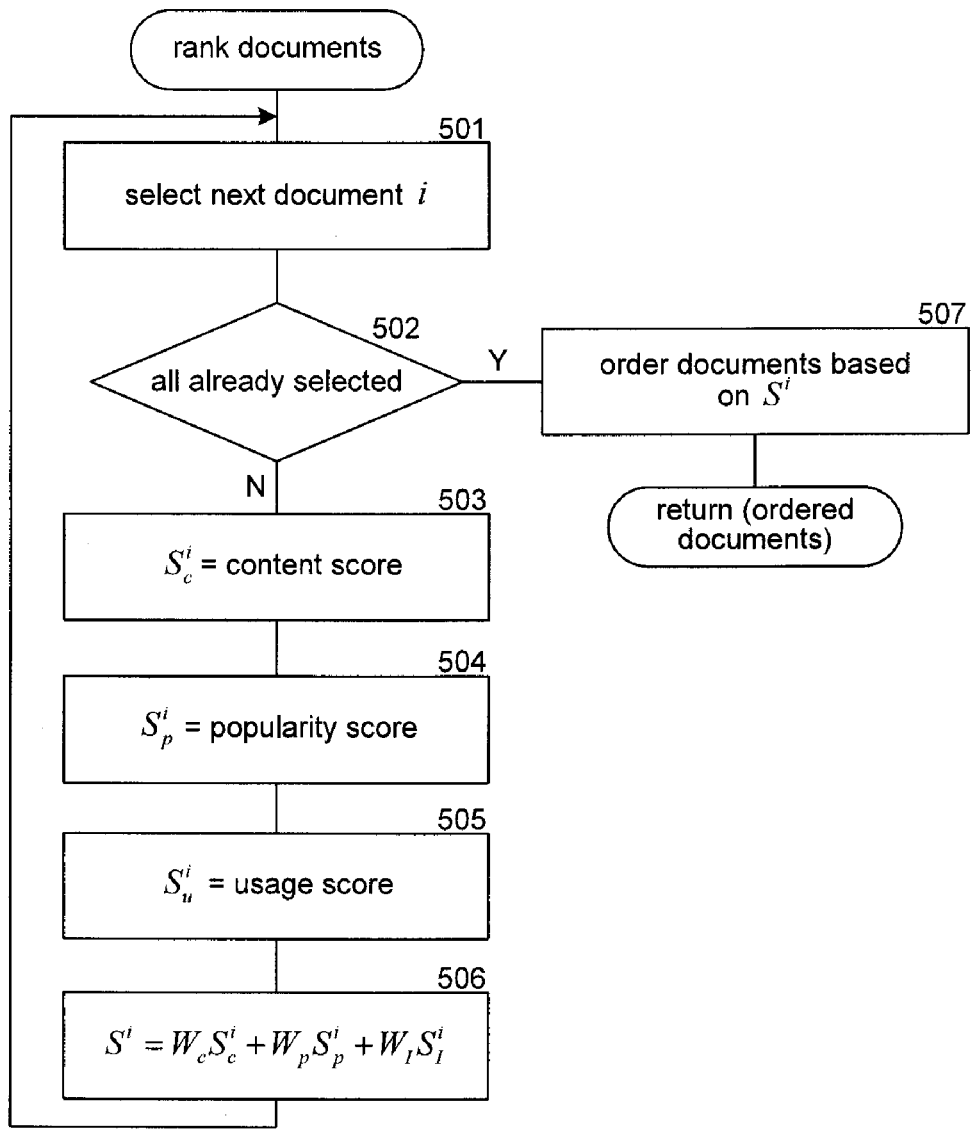
FIG. 5 is a flow diagram illustrating the processing of the rank documents component that uses the recent usage scores of the measurement system in one embodiment.

FIG. 5 is a flow diagram illustrating the processing of the rank documents component that uses the recent usage scores of the measurement system in one embodiment. The rank documents component may be invoked by a search engine to rank the search results. The component is passed the documents of a search result to be ranked and the search request. In block 501, the component selects the next document. In decision block 502, if all the documents have already been selected, then the component continues at block 507, else the component continues at block 503. In block 503, the component calculates a content score indicating the relevance of the content of the document to the search request. In block 504, the component calculates a popularity score indicating the popularity of the document. For example, the popularity of a document may be based on a page rank score. In block 505, the component sets a document usage score. The document usage score may be derived from the recent usage scores of the keyword within the document. For example, a document that contains many occurrences of a keyword with a high recent usage score may have a high document usage score, which will increase its ranking score. In block 506, the component combines the content score, popularity score, and document usage score for the selected document to generate a ranking score for the selected document. The content, popularity, and document usage scores may be combined using various weighting factors that may be learned using a machine learning algorithm. The component then loops to block 501 to select the next document. In block 507, the component orders the documents based on their ranking scores. The component then returns the ordered documents.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a computing device with a processor and a memory for assessing keyword usage, the method comprising:

providing frequency of keywords during various periods;

calculating by the computing device a frequency impulse score for a keyword, the frequency impulse score indicating amount of recent change in frequency of the keyword according to the following equation:

$$I_n = \left(f_n - \sum_{i=1}^{n-1} f_i * \alpha_i\right) / f_n$$

where $I_n$ represents the frequency impulse score for period n, $f_n$ represents the frequency of the keyword during the period n divided by the total frequency of all keywords during the period n, and $\alpha_i$ represents a decay factor during period i according to the following equation:

$$\alpha_i = 2^{i-n};$$

calculating by the computing device a frequency weight for the keyword, the frequency weight indicating a recent measure of the frequency of the keyword according to the following equation:

$$W_n = \log\left(\sum_{i=1}^{n} freq_i * \alpha_i\right)$$

where $W_n$ represents the frequency weight for period n and $freq_i$ represents the frequency during period i; and combining the frequency impulse score and frequency weight of the keyword to give the recent usage score for the keyword for a recent period according to the following equation:

$$U_n = I_n * W_n$$

where $U_n$ represents the recent usage score for period n.

2. The method of claim 1 wherein a recent period refers to a certain period relative to prior periods.

3. The method of claim 1 wherein a magnitude of a positive recent usage score indicates amount of increase in keyword usage and a magnitude of a negative recent usage score indicates amount of decrease in keyword usage.

4. The method of claim 1 wherein the frequency impulse score is a difference between a ratio of a recent frequency of the keyword to a recent total frequency for multiple keywords and a ratio of a combination of less recent frequencies of the keyword to less recent total frequencies for multiple keywords.

5. The method of claim 4 wherein the ratio of the combination applies a decay factor based on recency of the period.

6. The method of claim 1 including ranking documents of a search based at least in part on the recent usage scores of terms of the documents.

7. The method of claim 1 including selecting keywords for placement of advertisements based at least in part on the recent usage scores of the keywords.

8. A computer-readable medium encoded with instructions for controlling a computing device to assess keyword usage, by a method comprising:
    providing a search log for each of a plurality of periods, a search log of a period indicating search requests submitted to a search engine service during that period, each search request including keywords;
    calculating a frequency impulse score for a keyword, the frequency impulse score indicating a change in frequency of the keyword occurring in search requests of a search log for a recent period, the frequency impulse score being based on a difference between a ratio of a frequency of the keyword occurring in search requests of the search log for the recent period to a total frequency for multiple keywords occurring in search requests of the search log for the recent period and a ratio of a combination of frequencies of the keyword occurring in search requests of search logs for less recent periods to total frequencies for multiple keywords occurring in search requests of search logs for less recent periods, wherein the ratio of the combination applies a decay factor based on recency of the search log such that the ratio for more recent search logs is weighted more heavily than the ratio for less recent search logs;
    calculating a frequency weight for the keyword, the frequency weight indicating a measure of the frequency of the keyword occurring in search requests of the search log for the recent period; and
    multiplying the frequency impulse score and frequency weight of the keyword to give a recent usage score of the keyword.

9. The computer-readable medium of claim 8 wherein the difference is further divided by the ratio of the frequency of the keyword occurring in search requests of the search log for the recent period to the total frequency for multiple keywords occurring in search requests of the search log for the recent period.

10. The computer-readable medium of claim 8 wherein the frequency weight is based on a logarithm of the frequency of the keyword occurring in search requests of the search log for the recent period and a logarithm of the frequency of the keyword occurring in search requests of search logs for less recent periods by applying a decay factor based on recency.

11. The computer-readable medium of claim 8 wherein the recent usage score is calculated according to the following:

$$U_n = \left(\left(f_n - \sum_{i=1}^{n-1} f_i * \alpha_i\right) \Big/ f_n\right) * \log\left(\sum_{i=1}^{n} freq_i * \alpha_i\right).$$

12. A computing system for ranking documents, comprising:
    a data store that indicates frequency of keywords; a memory storing computer-executable instructions of:
    a component that calculates a recent usage score for a keyword by combining a frequency impulse score for the keyword and a frequency weight of the keyword, the frequency impulse score indicating a recent change in frequency of the keyword and the frequency weight indicating a recent measure of the frequency of the keyword, the frequency impulse score being based on a difference between a ratio of a frequency of the keyword occurring in search requests of the search log for the recent period to a total frequency for multiple keywords occurring in search requests of the search log for the recent period and a ratio of a combination of frequencies of the keyword occurring in search requests of search logs for less recent periods to total frequencies for multiple keywords occurring in search requests of search logs for less recent periods, wherein the ratio of the combination applies a decay factor based on a recency of the search log such that the ratio for more recent search logs is weighted more heavily than the ratio for less recent search logs; and
    a component that ranks documents of a search result of a search request based at least in part on the recent usage score of the keyword.

13. The computing system of claim 12 wherein the rank of a document is modified based on the recent usage score of the keyword when the document contains a word relating to the keyword.

14. The computing system of claim 13 wherein the rank is modified only when the search request also contains a word relating to the keyword.

* * * * *